United States Patent
He et al.

(10) Patent No.: US 12,197,922 B2
(45) Date of Patent: Jan. 14, 2025

(54) ELECTRONIC DEVICE WITH INTELLIGENT BOOT

(71) Applicant: Apple Inc., Cupertino, CA (US)

(72) Inventors: Wei He, San Jose, CA (US); Eugene Kim, Cupertino, CA (US); Guangyu Liu, San Jose, CA (US); Suhak Lee, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 13 days.

(21) Appl. No.: 17/945,950

(22) Filed: Sep. 15, 2022

(65) Prior Publication Data

US 2024/0095039 A1    Mar. 21, 2024

(51) Int. Cl.
*G06F 9/4401* (2018.01)
*H02J 7/00* (2006.01)

(52) U.S. Cl.
CPC .......... *G06F 9/4403* (2013.01); *H02J 7/0048* (2020.01)

(58) Field of Classification Search
CPC .............................. G06F 9/4403; H02J 7/0048
See application file for complete search history.

(56) References Cited

U.S. PATENT DOCUMENTS

| | | | |
|---|---|---|---|
| 2004/0150372 A1* | 8/2004 | Lee | H02J 7/0031 320/148 |
| 2008/0180264 A1* | 7/2008 | Lee | H02J 7/0031 340/636.15 |
| 2009/0267570 A1* | 10/2009 | Paunonen | G06F 1/28 320/137 |
| 2012/0185684 A1* | 7/2012 | Lee | G06F 11/1417 713/2 |
| 2015/0102670 A1* | 4/2015 | Son | H02J 7/0068 307/26 |
| 2018/0107490 A1* | 4/2018 | Poornachandran | G06F 1/3287 |
| 2022/0352739 A1* | 11/2022 | Pk | G01R 31/3835 |

* cited by examiner

*Primary Examiner* — Zhipeng Wang
(74) *Attorney, Agent, or Firm* — BAKERHOSTETLER

(57) ABSTRACT

A system includes a processor, a charger circuit and a battery management unit (BMU). The charger circuit charges a battery. The BMU includes an intelligent boot module that can send a boot signal to the processor based on information including a battery condition and system information. The processor starts a boot sequence based on the boot signal.

20 Claims, 5 Drawing Sheets

ELECTRONIC DEVICE WITH INTELLIGENT BOOT

TECHNICAL FIELD

The present description relates generally to electronic devices, for example, to an electronic device with intelligent boot mechanism.

BACKGROUND

After a shutdown of an electronic device, the user may boot up the device by pressing the power button or plugging it into a charger. To ensure a good user experience, the device has to ensure that the battery has sufficient charge to support the required power draw during the boot process. If the battery cannot support the boot power draw, it may cause the device to shut down again during the boot process (i.e., fall into a boot-loop). On the other hand, if the device over-predicts the amount of charge required for booting, then it will lead to an unnecessary long boot process, which can also cause a bad user experience. The required power draw will depend on multiple factors, for example, battery state of charge, battery age, type of charger plugged in, and shutdown event before booting.

BRIEF DESCRIPTION OF THE DRAWINGS

Certain features of the subject technology are set forth in the appended claims. However, for the purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

In some aspects, the subject technology is directed to an electronic device with intelligent boot mechanism. The intelligent boot mechanism of the subject technology mitigates the boot-loop risk while reducing the boot time to prevent undesirable user experience due to an unnecessary long-boot process. The disclosed system and method enable the electronic device to determine the boot conditions based on a battery model, recognition of the charger types, and readings from a battery management unit (BMU) to determine a desired condition and start the boot process based on the desired condition.

In order to prevent the boot-loop risk and long boot time, the disclosed solution determines a required power draw during the boot process and makes certain the electronic device can provide the required power draw before initiating a boot. The required power draw depends on multiple factors, for example, battery state of charge, battery age, type of charger plugged in, and shutdown event before booting. The subject technology includes a number of benefits including, but not limited to, determining the battery states, required boot power, and charger plug-in conditions to determine whether the device is ready for the boot to provide a better user experience by reducing boot-loop risk and boot time.

Figure 1:
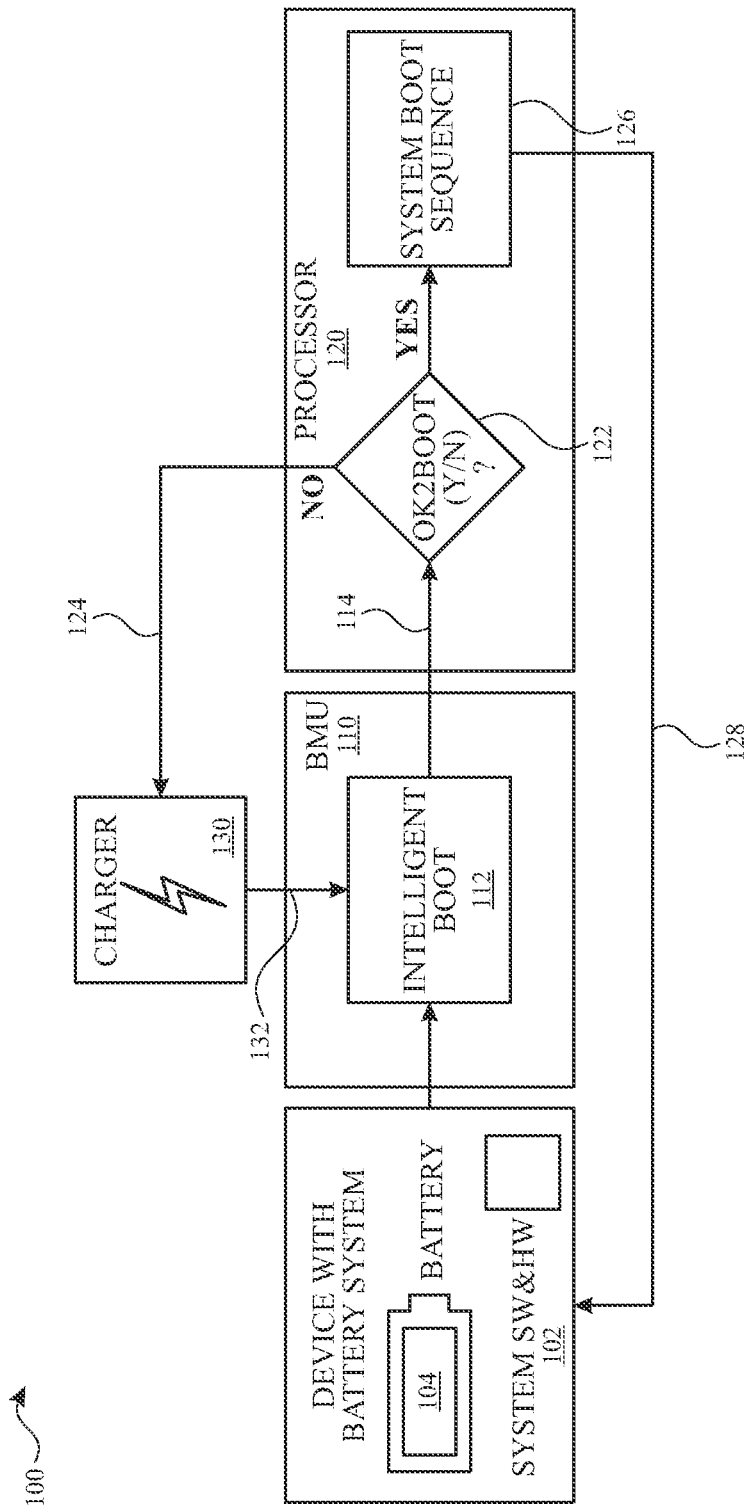
FIG. 1 is a high-level block diagram illustrating an example of system with intelligent boot, according to one or more implementations of the subject technology.

FIG. 1 is a high-level block diagram illustrating an example of system 100 with an intelligent boot, according to one or more implementations of the subject technology. The system 100 includes system software (SW) and hardware (HW) 102, a battery 104, a BMU 110, a processor 120, and a charger circuit 130, which can provide power for charging the battery through the BMU 110. The BMU 110 includes an intelligent boot module 112 that can send a boot signal 114 to a control process 122 of the processor 120 based on information including a battery condition and system information. The processor 120 uses the control process 122 to make sure that the battery charge is sufficient for the boot process to start, and if the battery charge is low, sends a command 124 to the charger circuit 130 to charge the battery 104. In case the battery charge is sufficient, a system boot sequence 126 is started that in turn sends a boot command 128 to the system SW and HW 102.

The battery condition includes, for example, a battery voltage, a battery current and a battery model; and the system information includes a charger circuit information, a system boot power information and a cutoff voltage. The intelligent boot module 112 receives a charger-connect indicator 132 from the charger circuit 130 to determine a state of connection (connected or not) of the charger to the charger circuit 130. The intelligent boot module 112 may receive a high-power charger indicator (not shown for simplicity) from the processor 120 to indicate, for example, that the charger is a high-power charger (e.g., having a power of greater than about 10 Watts). The intelligent boot module 112 determines a battery charge level for a system boot and compare that with a state-of-charge (SOC) of the battery. This is to confirm that the determined battery charge level for the system boot is compatible with the SOC of the battery, as discussed in more details herein. The intelligent boot module 112 further confirms that a cell voltage of the battery is greater than the effective SOC cutoff voltage by a predetermined value.

Figure 2:
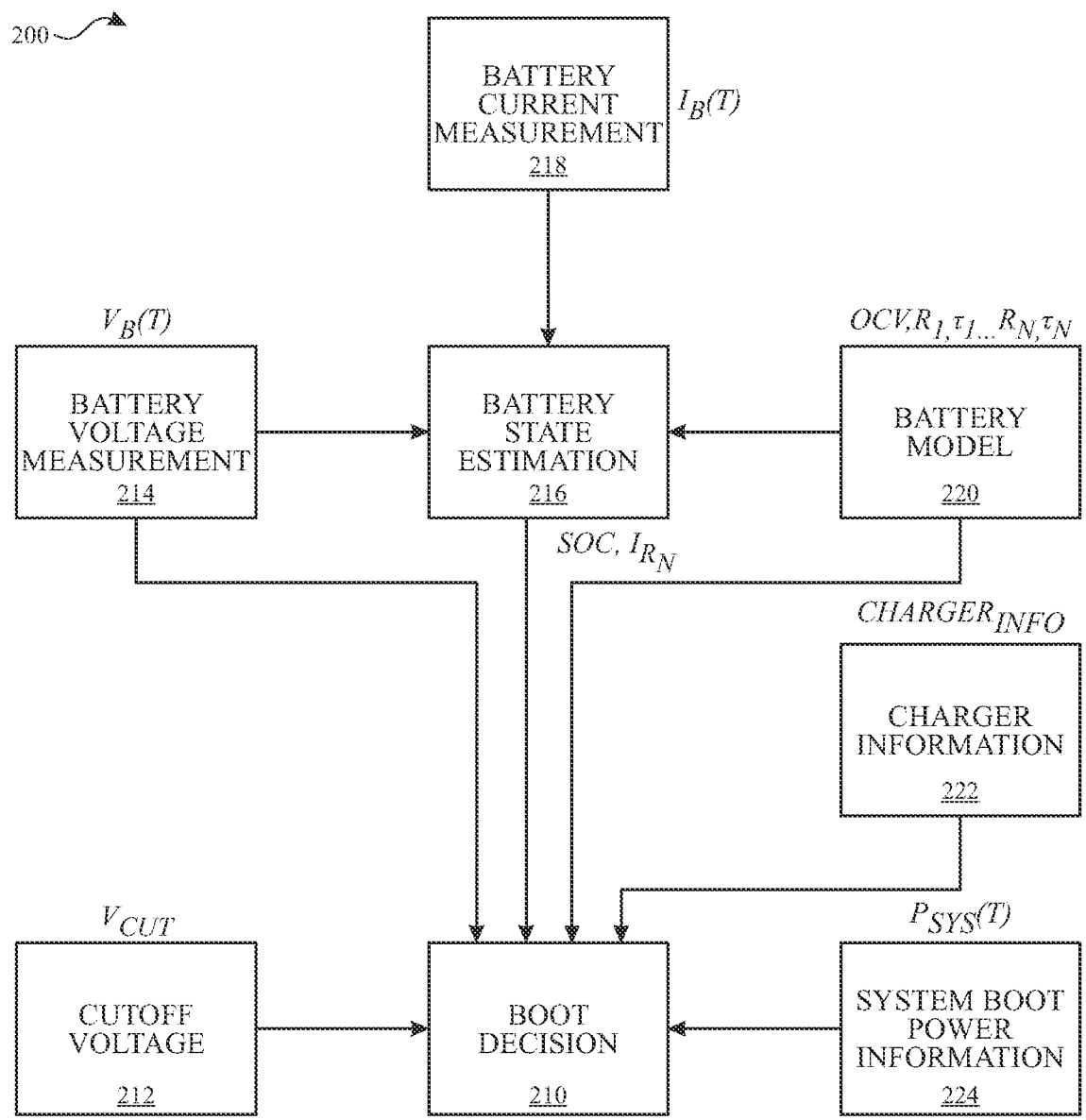
FIG. 2 is a high-level diagram illustrating an example of an information-based intelligent boot decision making used by the system of FIG. 1, according to one or more implementations of the subject technology.

FIG. 2 is a high-level diagram illustrating an example of an information-based intelligent boot decision making 200 used by the system 100 of FIG. 1, according to one or more implementations of the subject technology. The information-based intelligent boot decision making 200 is based on battery condition and system information. The decision-making module 210 receives an estimate of the battery from a battery condition module 216, which in turn receives the battery current and voltage from a battery current measurement module 218 and a battery voltage measurement 214, respectively. The battery condition module 216 may also use the battery model 220. The decision-making module 210 also directly uses the battery current and voltage from the battery current measurement module 218 and a battery voltage measurement 214, respectively. Additionally, the decision-making module 210 uses charger information 222, a cutoff voltage 212, system boot power information 224 and current temperature.

The battery model, for example, involves an open-circuit voltage (OCV), a resistance R and a time constant r of the battery, which is a product of the resistance and capacitance of the battery. The charger information 222 may include, but is not limited to a current, a voltage, and a power deliverable by the charger and the charger type (wireless or wired). The cutoff voltage 212, is the effective SOC cutoff voltage, which a battery voltage at which the system shutdown.

Figure 3:
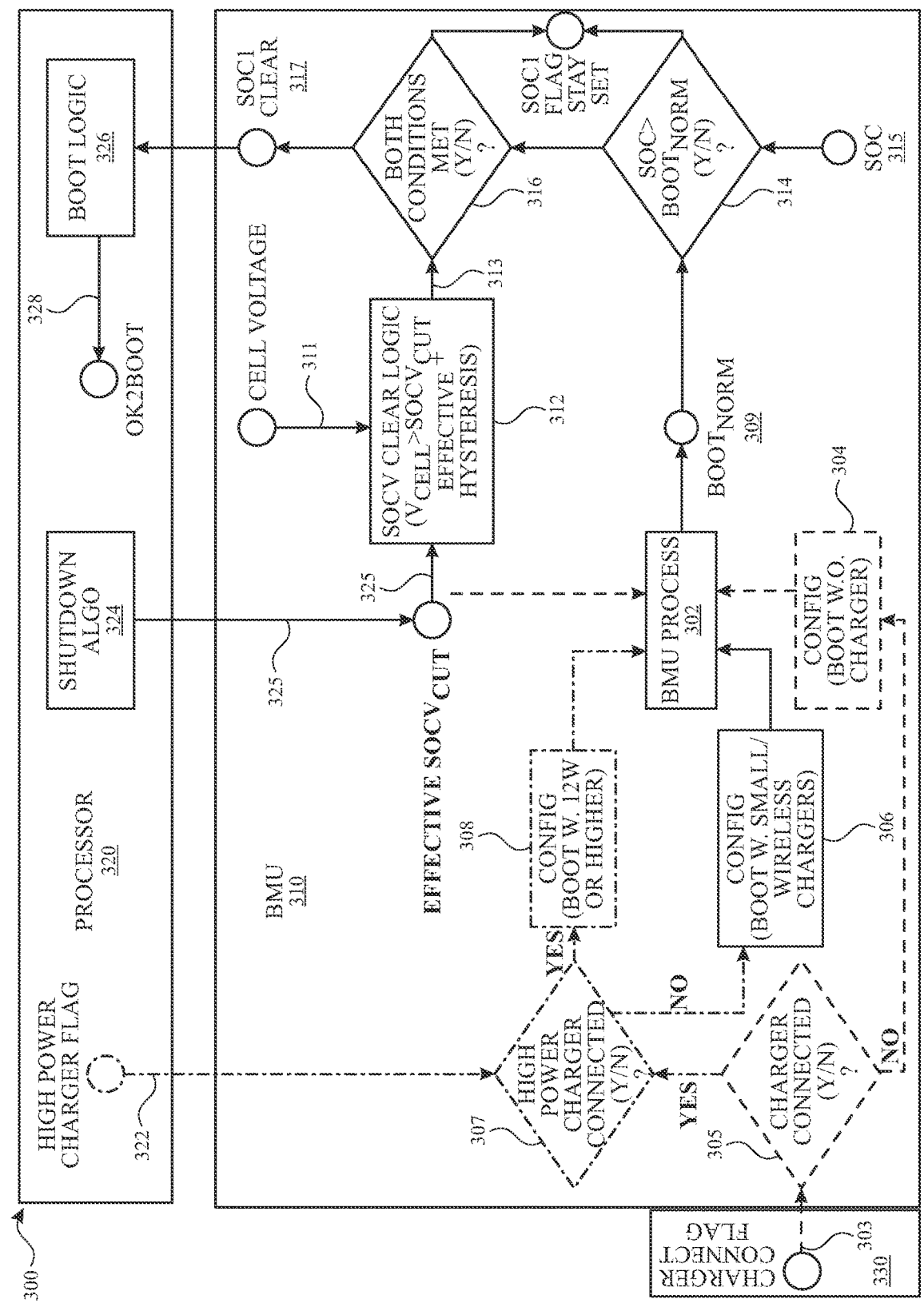
FIG. 3 is a schematic diagram illustrating an example of system with intelligent boot, according to one or more implementations of the subject technology.

FIG. 3 is a schematic diagram illustrating an example of a system 300 with intelligent boot, according to one or more implementations of the subject technology. The system 300 includes, but is not limited to, a BMU 310, a processor 320, a charger circuit 330. The BMU 310 includes an a BMU process 302 (also known as Imax), which determines a power, a current or a charge needed for a normal boot based on information collected from a number of sources such as the processor 320 and the charger circuit 330. The BMU process 302 provides a $boot_{norm}$ output 309, which can, for example, be specified as a percentage of the capacity of the battery.

The BMU process 302 receives inputs from three config (Imax configuration) blocks 304, 306 and 308. The config block 304 receives input from a control block 305, which in turn, uses an indicator (flag) 303 provided by the charger circuit 330 to determine whether a charger is connected to the charger circuit 330. If no charger is connected to the charger circuit 330, the config block 304 causes the BMU process 302 to base its evaluation on booting without a charger. If a charger is connected to the charger circuit 330, a control block 307 decides based on a high-power charger indicator (flag) 322 receivable from the processor 320 whether the charger connected to the charger circuit 330 is a high-power charger. If the charger is a high-power charger (e.g., greater than about 10 Watts), the config block 308 causes the BMU process 302 to base its evaluation on booting without a high-power charger. Otherwise, if the charger is a low-power charger (e.g., wireless charger) the config block 306 causes the BMU process 302 to base its evaluation on booting without a low-power charger.

The $boot_{norm}$ output 309 is received by the control block 314, which compares it with a SOC 315 of the battery and if the SOC is higher than $boot_{norm}$ output 309 (required charge for normal boot), a positive indicator is sent to the control block 317. The control block 316 also receives input 313 from a logic circuit 312, which makes sure that the cell voltage 311 is higher than the effective SOC cutoff voltage 325 by a margin (hysteresis). The effective SOC cutoff voltage 325 is available from a shut-down process (algorithm) 324 of the processor 320. The control block 316 sends a SOC clear signal to a boot logic circuit 326 of the processor 320, after confirming that the SOC is higher than the $boot_{norm}$ output 309 provided by the BMU process 302 and the cell voltage is larger than the effective SOC cutoff voltage 325. The boot logic circuit 326, in turn, sends a boot signal 328 (Ok2Boot) for booting to start.

Figure 4:
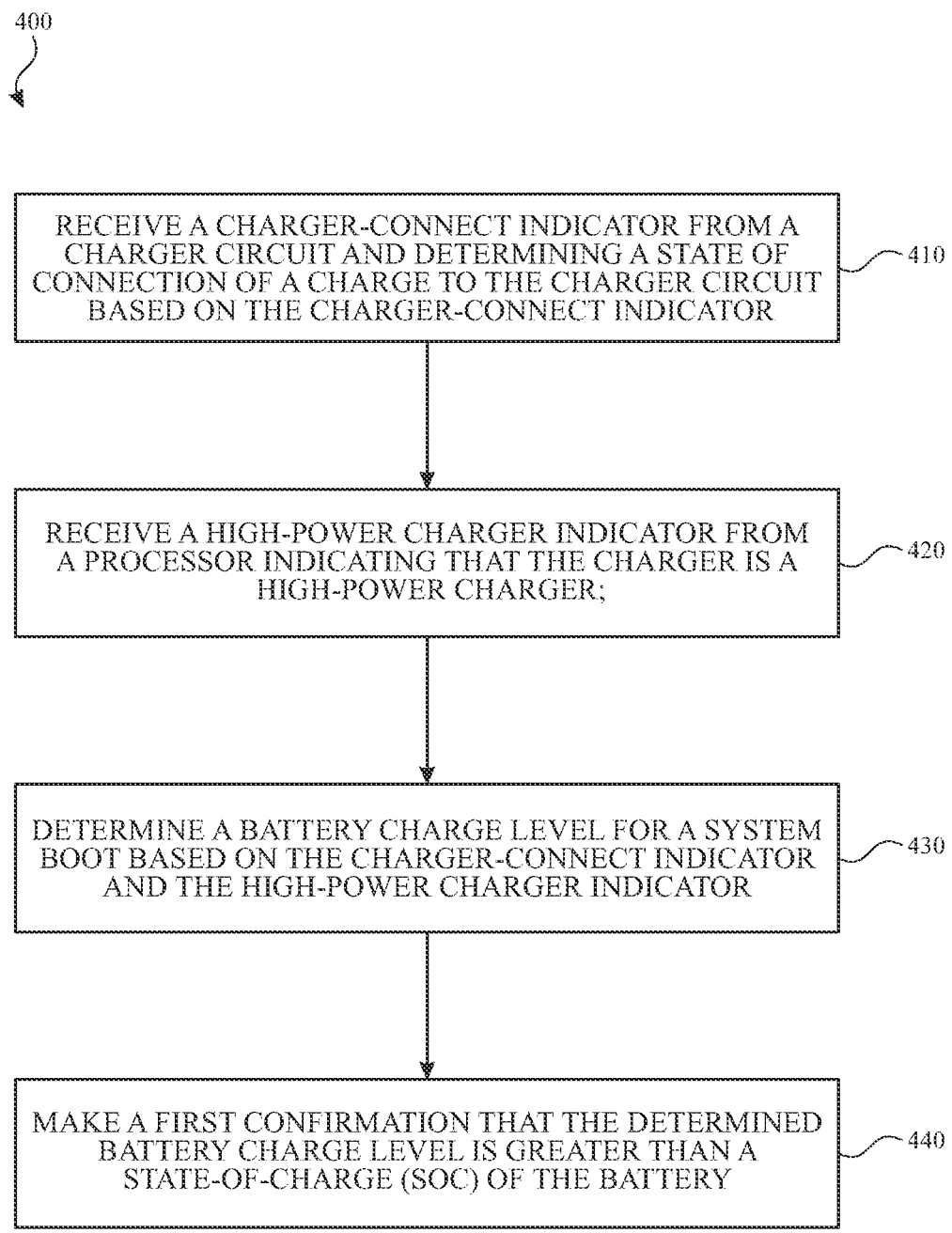
FIG. 4 is a flow diagram illustrating an example of a process for performing an intelligent boot, according to one or more implementations of the subject technology.

FIG. 4 is a flow diagram illustrating an example of a process 400 for performing an intelligent boot, according to one or more implementations of the subject technology. The process 400 includes receiving a charger-connect indicator (e.g., flag, 303 of FIG. 3) from a charger circuit (e.g., 330 of FIG. 3) and determining a state of connection of a charger to the charger circuit based on the charger-connect indicator (410). The process 400 also includes receiving a high-power charger indicator (e.g., 322 of FIG. 3) from a processor (e.g., 320 of FIG. 3) indicating that the charger is a high-power charger (420). Next, the battery charge level for a system boot is determined based on the charger-connect indicator and the high-power charger indicator (430). Finally, a first confirmation is made (e.g., by 314 of FIG. 3) that the determined battery charge level is greater than a state-of-charge (SOC) of the battery (e.g., 315 of FIG. 3) (440).

Figure 5:
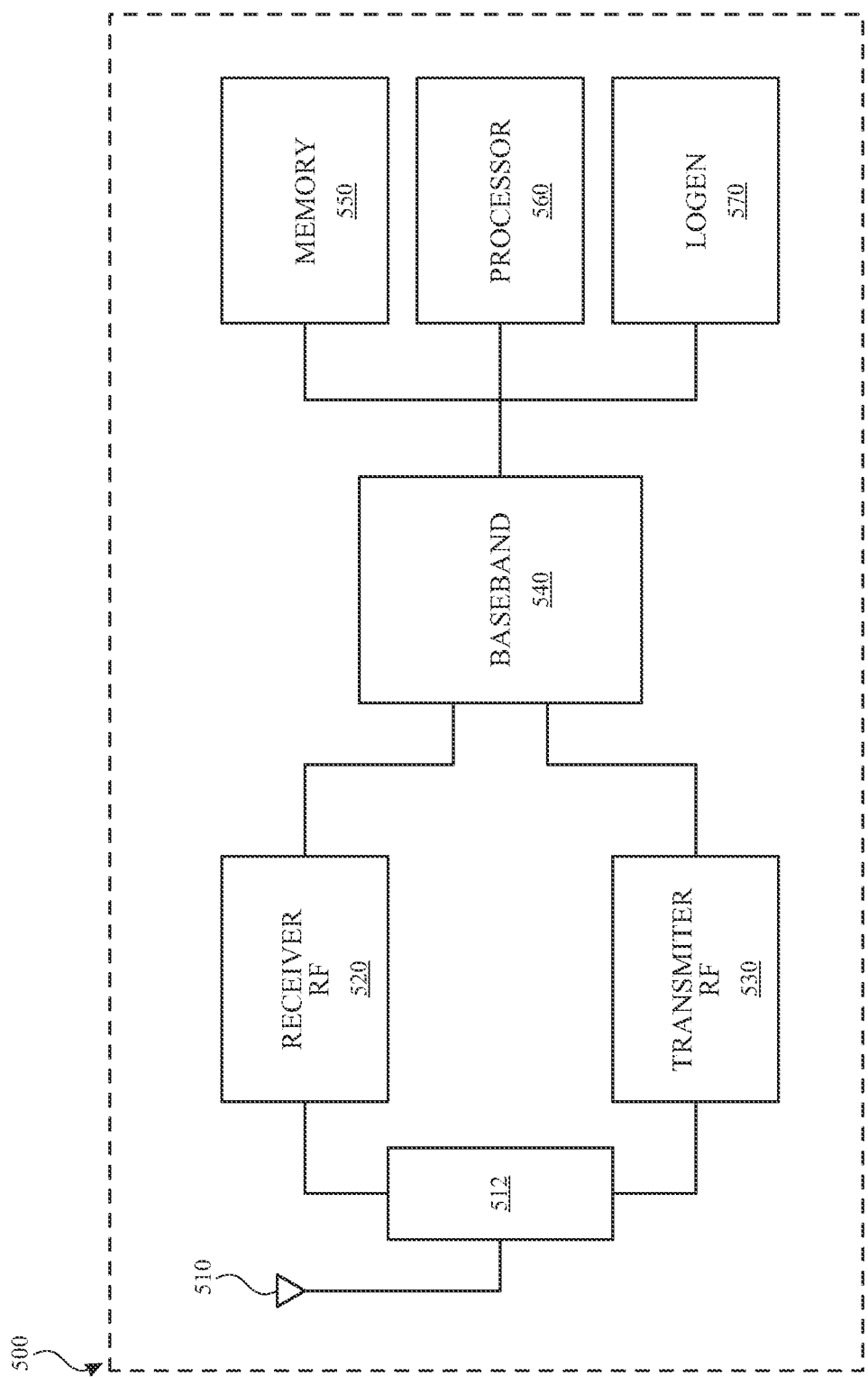
FIG. 5 is a schematic diagram illustrating an example of an electronic device within which aspects of the subject technology may be implemented.

FIG. 5 is a schematic diagram illustrating an example of an electronic device 500 within which aspects of the subject technology may be implemented. In some aspects, the electronic device 500 may represent a communication device (e.g., a smartphone or smartwatch), a tablet, a laptop or desktop computer or any other electronic device. The electronic device 500 may comprise a radio frequency (RF) antenna 510, a receiver 520, a transmitter 530, a baseband processing module 540, a memory 550, a processor 560, and a local oscillator generator (LOGEN) 570. In various embodiments of the subject technology, one or more of the blocks represented in FIG. 5 may be integrated on one or more semiconductor substrates. For example, the blocks 520-570 may be realized in a single chip or a single system on chip or may be realized in a multi-chip chipset.

The RF antenna 510 may be suitable for transmitting and/or receiving RF signals (e.g., wireless signals) over a wide range of frequencies. Although a single RF antenna 510 is illustrated, the subject technology is not so limited.

The receiver 520 may comprise suitable logic circuitry and/or code that may be operable to receive and process signals from the RF antenna 510. The receiver 520 may, for example, be operable to amplify and/or down-convert received wireless signals. In various embodiments of the subject technology, the receiver 520 may be operable to cancel noise in received signals and may be linear over a wide range of frequencies. In this manner, the receiver 520 may be suitable for receiving signals in accordance with a variety of wireless standards. Wi-Fi, WiMAX, Bluetooth, and various cellular standards. In various embodiments of the subject technology, the receiver 520 may not require any SAW filters, and few or no off-chip discrete components, such as large capacitors and inductors.

The transmitter 530 may comprise suitable logic circuitry and/or code that may be operable to process and transmit signals from the RF antenna 510. The transmitter 530 may, for example, be operable to up-convert baseband signals to RF signals and amplify RF signals. In various embodiments of the subject technology, the transmitter 530 may be operable to up-convert and amplify baseband signals processed in accordance with a variety of wireless standards. Examples of such standards may include Wi-Fi, WiMAX, Bluetooth, and various cellular standards. In various embodiments of the subject technology, the transmitter 530 may be operable to provide signals for further amplification by one or more power amplifiers.

The duplexer 512 may provide isolation in the transmit band to avoid saturation of the receiver 520 or damaging parts of the receiver 520, and to relax one or more design requirements of the receiver 520. Furthermore, the duplexer 512 may attenuate the noise in the receive band. The duplexer may be operable in multiple frequency bands of various wireless standards.

The baseband processing module 540 may comprise suitable logic, circuitry, interfaces, and/or code that may be operable to perform processing of baseband signals. The baseband processing module 540 may, for example, analyze received signals, and generate control and/or feedback signals for configuring various components of the electronic device 500, such as the receiver 520. The baseband processing module 540 may be operable to encode, decode, transcode, modulate, demodulate, encrypt, decrypt, scramble, descramble, and/or otherwise process data in accordance with one or more wireless standards. In some implementations, the baseband processing module 540 may include an intelligent boot circuit and perform the functionalities of the intelligent boot of the subject technology, as described above.

The processor 560 may comprise suitable logic, circuitry, and/or code that may enable processing data and/or controlling operations of the electronic device 500. In this regard, the processor 560 may be enabled to provide control signals to various other portions of the electronic device 500. The processor 560 may also control transfers of data between various portions of the electronic device 500. Additionally, the processor 560 may enable implementation of an operating system or otherwise execute code to manage operations of the electronic device 500. In some implementations, the processor 560 may replace or execute some or all the functionalities of the processor 320 of FIG. 3 as described above with respect to FIG. 3.

The memory 550 may comprise suitable logic, circuitry, and/or code that may enable storage of various types of information such as received data, generated data, code, and/or configuration information. The memory 550 may comprise, for example, RAM, ROM, flash, and/or magnetic storage. In various embodiment of the subject technology, information stored in the memory 550 may be utilized for configuring the receiver 520, and/or the baseband processing module 540.

The local oscillator generator (LOGEN) 570 may comprise suitable logic, circuitry, interfaces, and/or code that may be operable to generate one or more oscillating signals of one or more frequencies. The LOGEN 570 may be operable to generate digital, and/or analog signals. In this manner, the LOGEN 570 may be operable to generate one or more clock signals, and/or sinusoidal signals. Characteristics of the oscillating signals such as the frequency and duty cycle may be determined based on one or more control signals from, for example, the processor 560, and/or the baseband processing module 540.

In operation, the processor 560 may configure the various components of the electronic device 500 based on a wireless standard according to which it is desired to receive signals. Wireless signals may be received via the RF antenna 510 and amplified and down converted by the receiver 520. The baseband processing module 540 may perform noise estimation and/or noise cancellation, decoding, and/or demodulation of the baseband signals. In this manner, information in the received signal may be recovered and utilized appropriately. For example, the information may be audio and/or video to be presented to a user of the electronic device, data to be stored to the memory 550, and/or information affecting and/or enabling operation of the electronic device 500. The baseband processing module 540 may modulate, encode, and perform other processing on audio, video, and/or control signals to be transmitted by the transmitter 530 in accordance with various wireless standards.

As used herein, the phrase "at least one of" preceding a series of items, with the term "and" or "or" to separate any of the items, modifies the list as a whole rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but rather are intended to be used interchangeably. In one or more implementations, a processor configured to monitor and control an operation, or a component, may also mean the processor being programmed to monitor and control the operation, or the processor, being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, a configuration, the configuration, another configuration, some configurations, one or more configurations, the subject technology, the disclosure, the present disclosure, or any other variations thereof and alike are for convenience and do not imply that a disclosure relating to such phrase(s) is essential to the subject technology, or that such disclosure applies to all configurations of the subject technology. A disclosure relating to such phrase(s) may apply to all configurations or to one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary", or as an "example", is not necessarily to be construed as preferred or advantageous over other implementations. Furthermore, to the extent that the term "include", "have", or the like is used in the description or the claims, such term is intended to be inclusive in a manner similar to the term "comprise", as "comprise" is interpreted when employed as a transitional word in a claim.

All structural and functional equivalents to the elements of the various aspects described throughout this disclosure that are known, or later come to be known, to those of ordinary skill in the art are expressly incorporated herein by reference, and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language claims, wherein reference to an element in the singular is not intended to mean "one and only one", unless specifically so stated, but rather "one or more". Unless specifically stated otherwise, the term "some" refers to one or more. Pronouns in the masculine (e.g., his) include the feminine and neutral genders (e.g., her and its), and vice versa. Headings and subheadings, if any, are used for convenience only and do not limit the subject disclosure.

What is claimed is:

1. A system comprising:
a processor;
a charger circuit configured to charge a battery; and
a battery management unit (BMU) including an intelligent boot module,
wherein:
the intelligent boot module is configured to send a boot signal to the processor based on information including a battery condition and system information, the boot signal being sent based at least in part on a cell voltage of the battery being greater than a cutoff voltage by a predetermined value, and
the processor is configured to start a boot sequence based on the boot signal.

2. The system of claim 1, wherein the battery condition includes one or more of a battery voltage, a battery current or a battery model, wherein the processor is further configured to:
initiate the boot sequence for a system boot based on a determination with the boot signal that the battery condition is sufficient to initiate the boot sequence based on a first confirmation that a state-of-charge (SOC) of the battery is greater than a battery charge level for the system boot and a second confirmation that a cell voltage of the battery is greater than the cutoff voltage by the predetermined value; and
send a command to the charger circuit to charge the battery based on a determination with the boot signal that the battery condition is not sufficient to initiate the boot sequence.

3. The system of claim 1, wherein the system information includes a charger circuit information, a system boot power information and the cutoff voltage.

4. The system of claim 1, wherein the intelligent boot module is configured to receive a charger-connect indicator from the charger circuit to determine a state of connection of a charger to the charger circuit for reporting to a BMU process.

5. The system of claim 4, wherein the intelligent boot module is configured to receive a high-power charger indicator from the processor to indicate that the charger is a high-power charger for reporting to the BMU process, wherein the high-power charger has a power of greater than about 10 Watts.

6. The system of claim 5, wherein the intelligent boot module is configured to use the BMU process to determine a battery charge level for a system boot and compare that with a state-of-charge (SOC) of the battery.

7. The system of claim 6, wherein the intelligent boot module is further configured to receive the cutoff voltage as an effective SOC cutoff voltage from a shut-down process of the processor for reporting to the BMU process.

8. The system of claim 7, wherein the intelligent boot module is configured to make a first confirmation that the determined battery charge level for the system boot is compatible with the SOC of the battery.

9. The system of claim 8, wherein the intelligent boot module is further configured to make a second confirmation that the cell voltage of the battery is greater than the effective SOC cutoff voltage by the predetermined value.

10. The system of claim 9, wherein the intelligent boot module is configured to send the boot signal to the processor based on the first confirmation and the second confirmation.

11. An electronic device comprising:
a charger circuit configured to receive current from a charger and charge a battery; and
a processor,
wherein:
the processor is configured to start a boot sequence based on a decision formed based on information including a condition of the battery and additional device information, the boot sequence being started based at least in part on a cell voltage of the battery being greater than a cutoff voltage by a predetermined value.

12. The electronic device of claim 11, wherein the condition of the battery includes, a battery voltage, a battery current and a battery model, and the additional device information includes a charger circuit information, a system boot power information and the cutoff voltage.

13. The electronic device of claim 11, further comprising a battery management unit (BMU), wherein the decision is made by the BMU configured to receive a charger-connect indicator from the charger circuit to determine a state of connection of the charger to the charger circuit.

14. The electronic device of claim 13, wherein the BMU is configured to receive a high-power charger indicator from the processor to indicate that the charger is a high-power charger, wherein the high-power charger has a power of greater than about 10 Watts.

15. The electronic device of claim 14, wherein the BMU is configured to use a BMU process to determine a battery charge level for a system boot based on the charger-connect indicator and the high-power charger indicator and compare the determined battery charge level with a SOC of the battery.

16. The electronic device of claim 15, wherein the BMU is further configured to receive the cutoff voltage as an effective state-of-charge (SOC) cutoff voltage from a shut-down process of the processor for reporting to the BMU process.

17. The electronic device of claim 16, wherein the BMU is configured to make a first confirmation that the determined battery charge level for the system boot is compatible with the SOC of the battery and a second confirmation that the cell voltage of the battery is greater than the effective SOC cutoff voltage by the predetermined value and send a boot signal to the processor based on the first confirmation and the second confirmation.

18. A process implemented by a processor, the process comprising:
receiving a charger-connect indicator from a charger circuit and determining a state of connection of a charger to the charger circuit based on the charger-connect indicator;
receiving a high-power charger indicator from the processor indicating that the charger is a high-power charger;
determining a battery charge level for a system boot based on the charger-connect indicator and the high-power charger indicator;

making a first confirmation that the determined battery charge level is greater than a state-of-charge (SOC) of a battery; and making a second confirmation that a cell voltage of the battery is greater than an effective SOC cutoff voltage by a margin corresponding to a hysteresis of the effective SOC cutoff voltage.

19. The process of claim 18, further comprising receiving the effective SOC cutoff voltage from a shut-down process of the processor.

20. The process of claim 19, further comprising starting a boot process based on the first confirmation and the second confirmation.

\* \* \* \* \*

UNITED STATES PATENT AND TRADEMARK OFFICE
CERTIFICATE OF CORRECTION

| | | |
|---|---|---|
| PATENT NO. | : 12,197,922 B2 | Page 1 of 1 |
| APPLICATION NO. | : 17/945950 | |
| DATED | : January 14, 2025 | |
| INVENTOR(S) | : Wei He et al. | |

It is certified that error appears in the above-identified patent and that said Letters Patent is hereby corrected as shown below:

On the Title Page

Under (72) Inventors:
Replace: "Wei He, San Jose, CA (US); Eugene Kim, Cupertino, CA (US); Guangyu Liu, San Jose, CA (US); Suhak Lee, Cupertino, CA (US)", With: --Wei He, San Jose, CA (US); Guangyu Liu, San Jose, CA (US); Eugene Kim, Cupertino, CA (US); Suhak Lee, Cupertino, CA (US)--.

Signed and Sealed this
Thirteenth Day of May, 2025

Coke Morgan Stewart
*Acting Director of the United States Patent and Trademark Office*